No. 714,172. Patented Nov. 25, 1902.
H. GILES.
MEASURING SCALE.
(Application filed Jan. 27, 1902.)
(No Model.)
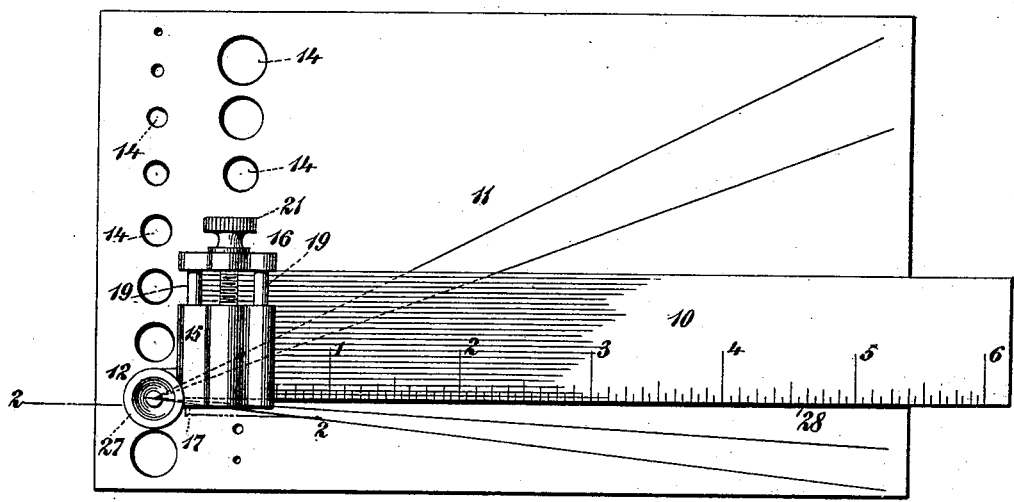
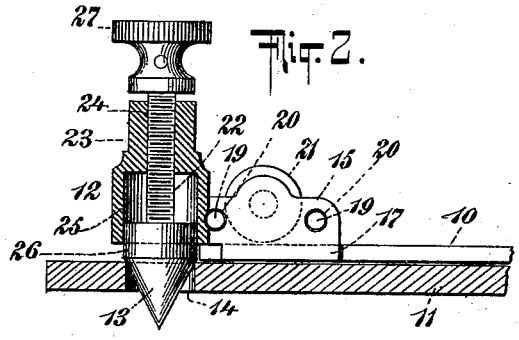
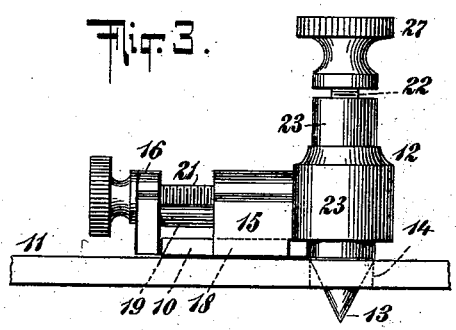
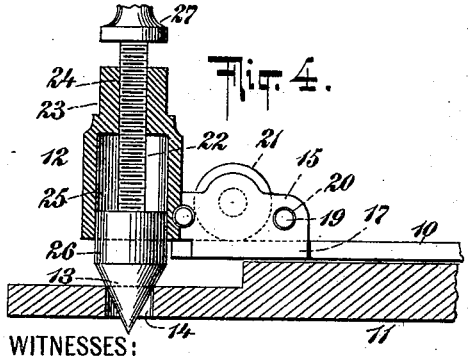
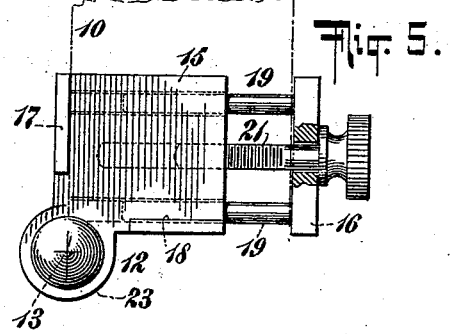
WITNESSES:
Gustave Dieterich
Edwin N. Dieterich
INVENTOR
Harvey Giles
BY Chas. C. Gill
ATTORNEY

UNITED STATES PATENT OFFICE.

HARVEY GILES, OF SOUTH BOUNDBROOK, NEW JERSEY.

MEASURING-SCALE.

SPECIFICATION forming part of Letters Patent No. 714,172, dated November 25, 1902.

Application filed January 27, 1902. Serial No. 91,304. (No model.)

*To all whom it may concern:*

Be it known that I, HARVEY GILES, a citizen of the United States, and a resident of South Boundbrook, in the county of Somerset and State of New Jersey, have invented certain new and useful Improvements in Measuring-Scales, of which the following is a specification.

The invention relates to improvements in measuring-scales; and it consists more especially in a novel attachment connected with the scale for enabling the accurate measuring on a true radial line from the center of a hole which may be formed in a piece of metal or other material to a distant point. The difficulties found by mechanics while laying out their work in accurately measuring from the center of a hole to a distant point are well understood, and the purpose of the present invention is to enable this measuring to be done quickly and accurately.

The invention will be fully understood from the detailed description hereinafter presented, reference being had to the accompanying drawings, in which—

Figure 1 is a top view of the measuring-scale and attachment constructed in accordance with and embodying the invention, the said scale and attachment being illustrated upon a piece of metal from the center of the holes in which it may be desired to measure to distant points whereat other holes are to be formed. Fig. 2 is a longitudinal section of same on the dotted line 2 2 of Fig. 1, the scale and metal plate being partly broken away. Fig. 3 is an end view of same, taken from the left-hand end of Fig. 1, the metal plate being partly broken away. Fig. 4 is a view corresponding with Fig. 2, but illustrating the application of the scale to a metal plate not having a flat upper surface; and Fig. 5 is a bottom view, partly in section, of the attachment, a portion of the scale being indicated by dotted lines.

In the drawings, 10 designates the measuring-scale, 11 a metal plate, and 12 the attachment applied upon the end of the scale 10 and constituting the essential part of the present invention. The scale 10 is an ordinary metal scale, and upon one end thereof is applied the attachment 12, which comprises two main features, one being means for securing the attachment to the scale and the other being the vertically-movable conical pin 13, adapted to enter a hole 14 in the plate 11, the said pin 13 being made conical, so that it may be adapted to varying sizes of the holes 14, as denoted in Fig. 1.

The means for securing the attachment 12 to the scale 10 consist in the present instance of the frame 15 and clamping-plate 16, the frame 15 having at one edge a downwardly-extending flange 17 to engage the side of the scale 10 and having at another edge the downwardly-extending flange 18 to engage the end of the scale 10, as shown in Fig. 3, the said flanges 17 and 18 being at right angles to one another, so as to securely engage and keep the frame 15 in proper alined relation with the end of the scale 10. The clamping-plate 16 is in line with the flange 17 of the frame 15, and it engages the edge of the scale 10 directly opposite to that edge thereof which is engaged by the flange 17. The clamping-plate 16 carries horizontal and parallel pins 19, which enter apertures 20 in the frame 15, said apertures 20 and said pins 19 affording guides for the clamping-plate 16 and preserving said plate 16 in parallel relation with the flange 17 of the frame 15. The clamping-plate 16 may be moved toward or from the frame 15, and said plate 16 is adapted to be clamped against the edge of the scale 10 by means of the screw 21, which passes freely through an aperture in the plate 16 and enters a threaded socket formed within the frame 15. By turning the screw in one direction the plate 16 will be moved tightly against the edge of the scale 10, and when the screw 21 is turned in an opposite direction the head of the screw will release the plate 16, and the attachment 12 may then be removed from the scale 10. The screw 21 operates to bind the plate 16 and flange 17 against the opposite edges of the scale 10 and in that way to hold the attachment 12 firmly upon the end of said scale.

The conical pin 13 is connected with the lower end of a screw 22, which is mounted within the vertically-arranged tubular casing 23 and engages a threaded bore 24 thereof. The casing 12 will preferably be formed integrally with the frame 15, by which it is supported, and the lower end of the casing 12 will by preference be equipped with a chamber 25, capable of receiving substantially the entire pin 13 when the latter is moved upward by the operation of the screw 22. The inner walls of the chamber 25 operate as guides for the upper end 26 of the pin 13, said upper end 26 having plain vertical surfaces snugly filling the chamber 25 in cross-section. The upper end of the screw 22 is provided with a head 27 for convenience in operating said screw. The purpose of the screw 22 is to enable the accurate vertical adjustment of the pin 13 in accordance with the size of the hole 14 in the plate or work 11 said pin is to wholly or in part enter.

The point or lower end of the pin 13 is in line with an operating edge 28 of the scale 10, so that in the employment of the scale and attachment a line drawn along the edge 28 of the scale would be in line with the pointed lower end of the pin 13 and in line with the center of any hole 14 into which said pin 13 might be projected. The point of the pin 13 is also at a predetermined distance from the end of the scale 10, and this distance will be governed by the horizontal diameter of the upper end 26 of said pin 13, and the diameter of the upper end of the pin 13 will be governed somewhat by the size of the scale and its attachment and the character of the work to which the invention may be applied. It is desirable, however, that the workman shall know just how far the point of the pin 13 is from the end of the scale 10, so that he may be accurate in his measurements from the center of a hole 14 to a distant point on the plate 11. If, for illustration, the point of the pin 13 should be three-sixteenths of an inch distant from the end of the scale 10 and the workman is to measure a distance of five inches from the center of the hole 14, containing said pin, he would necessarily allow for the said three-sixteenths of an inch, or, in other words, he would measure five inches from the center of the said hole 14, this under the conditions stated being represented on the scale 10 at the mark denoting four and thirteen-sixteenths inches.

In the employment of the invention the attachment 12 is secured to the end of the scale 10 by means of the screw 21, clamping-plate 16, and flanges 17 18 in the manner above described, and the attachment and scale are then ready for use. If it should be desired to measure from the center of a hole 14 to a distant point on the plate or work 11, the scale 10 would be placed upon the work 11 and the point of the screw would be inserted into the hole 14, from which the measurement is to take place. In applying the scale and the attachment to the work 11 the pin 13 would be adjusted so that its circumferential surfaces at some point would snugly and fully engage and close the hole 14, which would mean that the center of the point 13 would be at the true center of the hole 14, with the scale 10 lying flat against the work or plate 11. When the scale and attachment are in this condition and relation to the plate or work 11, the scale may be utilized for the purpose of drawing true radial lines from the center of the hole 14, as denoted in Fig. 1, and also for measuring to any predetermined points on the work 11 from the center of said hole 14. If, for instance, one hole 14 is in the plate or work 11 and it is desired to form in said plate another hole at a predetermined distance from the center of said hole 14, the workman may readily find the proper location for the second hole by means of the scale and its attachment, the center of the pin 13 always denoting the center of the first hole and there always being a predetermined distance between the center of said pin and the adjacent edge of the scale 10.

When the pin 13 is made conical in form, as shown, it is adapted for use in connection with any of the varying sizes of holes from a very small hole up to a hole equal in diameter to the diameter of the upper end 26 of the pin 13, since by adjusting the said pin vertically it will enter into engagement with the surfaces of the various sizes of holes, while allowing the scale 10 to assume a true position upon the plate or work 11. I illustrate in Fig. 1 the various sizes of holes to which a pin 13 three-eighths of an inch in diameter at its upper end is adapted, the conical sides of the pin being adapted to engage the edges of the several holes owing to the capability of adjusting said pin by means of the screw 22. When a hole is found which snugly receives the upper end 26 of the pin 13, this will be the largest hole that the pin 13 is capable of use in connection with, since if the holes are larger than the upper end of the pin 13 there is grave danger that the pin will not assume a truly central position within the hole, and hence that the resulting admeasurements may be inaccurate.

The pin 13 is guided in its movements and kept in proper vertical alinement by reason of the elongated bore 24, through which the screw 22 passes, and by reason of the fact that the walls of the chamber 25 are capable of snugly receiving and guiding the upper end of the pin 13. An occasion in which the present invention will be found to be of very great advantage is when, for instance, the upper surface of the plate or work 11 is not truly horizontal and the hole 14, whose center is to be measured from, is on a lower plane than a higher level of the plate where, for instance, a second hole is to be formed, as denoted in Fig. 4. When the work is thus irregular on its surface, a mechanic has some difficulty in accurately measuring from the center of the hole in a part of the work on one plane to a predetermined point for the center of a hole to be formed in a part of the work disposed on a higher plane; but with the present invention this difficulty is removed, since the scale 10 may lie flat upon the higher plane of the work, where the second hole is to be formed, while the pin 13 is adjusted by means of the screw 22 to find the center of the hole in that part of the work on the lower plane, and thus it is rendered very easy to measure from the center of the hole on the lower plane to the proper predetermined distance on the higher level of the work or plate.

The conical pin 13 and its casing 23 may vary in size as may be required for the character of work to which the scale and its attachment is to be applied—as, for illustration, the pin 13—and casing 23 may be of a diameter adapted to the size of holes from the center of which the admeasurements are to be taken, or said pin 13 and casing 23 may be elongated vertically, as shown in Fig. 4, so that said pin may properly reach holes located in a part of the work below the plane at which it may be desired to form other holes.

What I claim as my invention, and desire to secure by Letters Patent, is—

1. An instrument for enabling the accurate measuring on a true radial line from the center of holes varying in diameter to distant points on a piece of work, the said instrument comprising the scale, in combination with the conical pin 13 connected therewith and set a definite distance off from the end of the operating edge of the scale with its central point in line with said edge, and means for adjusting said pin so that its end may pass downward below the lower surface of said scale and fit into holes varying in diameter; substantially as and for the purposes described.

2. The scale, in combination with the conical pin 13 connected therewith, the screw for vertically adjusting said pin to adapt it to holes varying in diameter, and the casing receiving said screw and adapted to receive and guide the upper end of said pin, said pin being set a definite distance off from the end of the operating edge of the scale with its central point in line with said edge; substantially as set forth.

3. The scale, in combination with the attachment therefor, comprising the clamping-frame adapted to engage the opposite edges of said scale, the conical pin 13 carried by said frame, and means for adjusting said pin vertically so as to adapt it to holes varying in diameter, said pin being set a definite distance off from the end of the operating edge of the scale with its central point in line with said edge; substantially as set forth.

4. The scale, in combination with the attachment therefor, comprising the clamping-frame adapted to engage the opposite edges of said scale, the tubular casing 12 carried by said frame, the screw mounted in said casing, and the conical pin 13 carried by said screw and adapted to be adjusted vertically within said casing to adapt the lower portion of said pin to holes varying in diameter; substantially as set forth.

5. The scale, and the attachment therefor, comprising the frame 15 having the flanges 17 and 18 to engage the end and side edges of said scale, the clamping-plate 16 to engage the side edge of said scale opposite to the flange 17, and the screw 21 for detachably fastening said frame 15 and plate 16 to said scale, combined with the conical pin 13 carried at one corner of said frame 15, and means for adjusting said pin vertically to adapt it to holes varying in diameter, the center of said pin being in line with the operating edge of said scale; substantially as set forth.

6. The scale, in combination with the conical pin connected therewith and having the vertical cylindrical head 26, and means for adjusting said pin vertically so as to adapt its conical portion to holes varying in diameter, and said head to enter a hole of its diameter, said pin at its central point being in line with the operating edge of said scale; substantially as set forth.

7. The scale, in combination with the conical pin 13, connected therewith and having the vertical cylindrical head 26, the screw for vertically adjusting said pin to adapt it to the holes varying in diameter and to move said head into a hole of its own diameter, and the casing receiving said screw and adapted to receive the upper portion of said pin, the central point of said pin being in line with an operating edge of said scale; substantially as set forth.

Signed at New York, in the county of New York and State of New York, this 25th day of January, A. D. 1902.

HARVEY GILES.

Witnesses:
CHAS. C. GILL,
ARTHUR MARION.